Aug. 24, 1965 W. T. THRASHER 3,202,288

MOBILE TYPE SIGN

Filed Oct. 25, 1962 4 Sheets-Sheet 1

INVENTOR.
WARREN T. THRASHER
BY
Felix A. Russell

INVENTOR.
WARREN T. THRASHER
BY
Felix A. Russell

Aug. 24, 1965 W. T. THRASHER 3,202,288

MOBILE TYPE SIGN

Filed Oct. 25, 1962 4 Sheets-Sheet 3

INVENTOR.
WARREN T. THRASHER
BY
Felix A. Russell

INVENTOR.
WARREN T. THRASHER

BY [signature]

United States Patent Office 3,202,288
Patented Aug. 24, 1965

3,202,288

MOBILE TYPE SIGN

Warren T. Thrasher, Seminole, Okla., assignor to The Daw Corporation, Seminole, Okla., a corporation of Oklahoma Filed Oct. 25, 1962, Ser. No. 233,016
3 Claims. (Cl. 211—13)

The present invention relates to a mobile type sign and is a continuation-in-part of the applicant's prior application, Serial No. 178,434, filed March 8, 1962 and bearing the same title.

Generally there is provided a sheet of deformable material (such as rolled aluminum alloy, for example), which has been passed through one or more sets of roller dies or pierce and form dies that cut therein rows and columns of base-attached tongues. Eccentrically apertured discs or sequins are loosely hung on all or selected ones of said tongues. The tongues are preferably bent outwardly at right angles to the sheet during the cutting operation or immediately thereafter but the tongues may be left lying in the plane of the sheet for conserving shipping or storage space or to permit selected bending outwardly of tongues in a desired sign pattern.

The tongues are so shaped and spaced that adjacent rows or columns of base attached tongues are interconnected by very narrow attachment portions permitting easy bending and breaking of the connecting portions so that the sheet may be easily and quickly divided into separate strips of one or several rows or columns each. The bases of the tongues also extend downwardly to the plane of the sheet so that the sheet, or a strip thereof, can be flexed in any direction. The sign base may thus be bent to the contour of surfaces curved vertically and/or horizontally.

It is accordingly an object of the present invention to provide a base for mobile signs in the form of a sheet that is bendable either longitudinally or transversely of the sheet, or in both directions.

It is another object of the invention to provide a base for mobile signs having rows or columns of tongues in which the rows or columns are interconnected by small spaced base portions easily broken by bending so that the sheet may be quickly and easily divided into strips of one or several rows or columns of tongues.

It is a further object of the invention to provide a strip-type support for mobile sequin signs, the strip being bendable in any direction.

Figure 1:
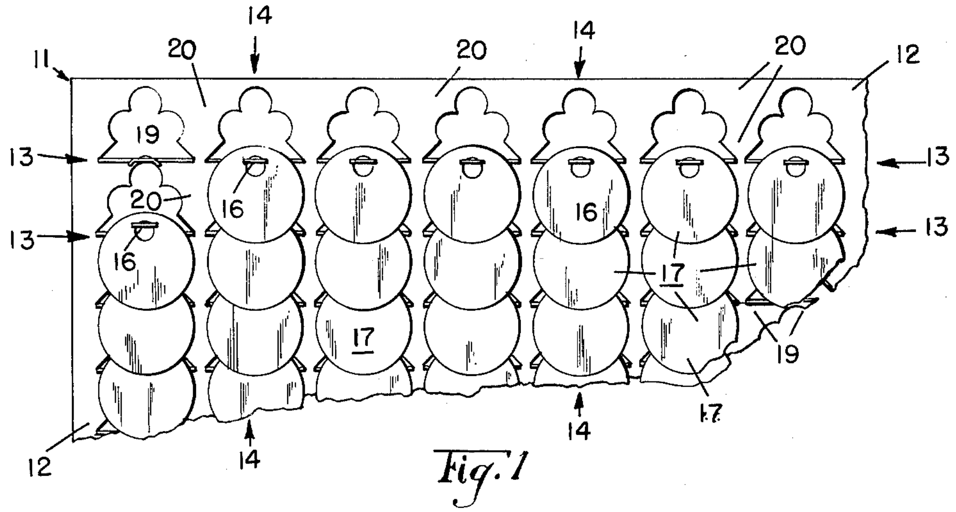
Figure 2:
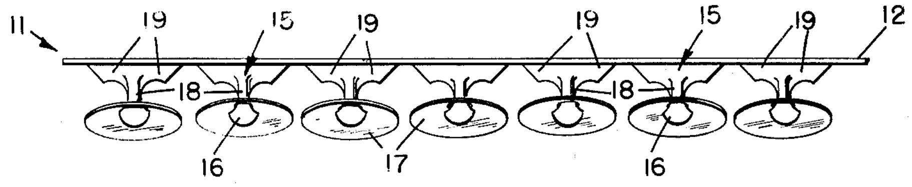
Figure 3:
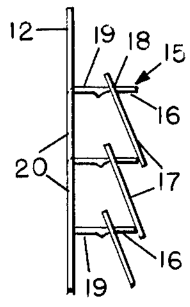
Figure 4:
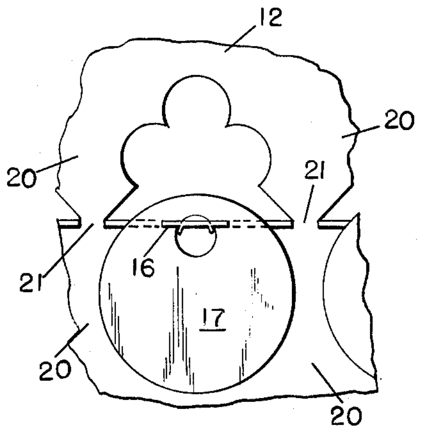
Figure 5:
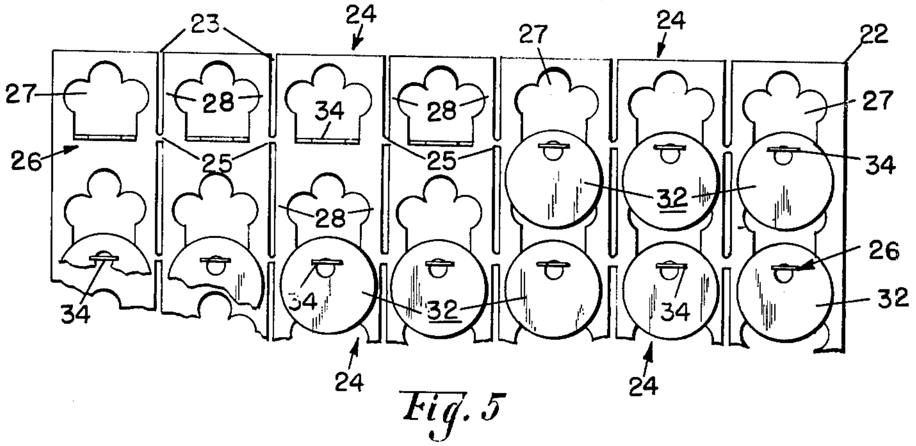
Figure 6:
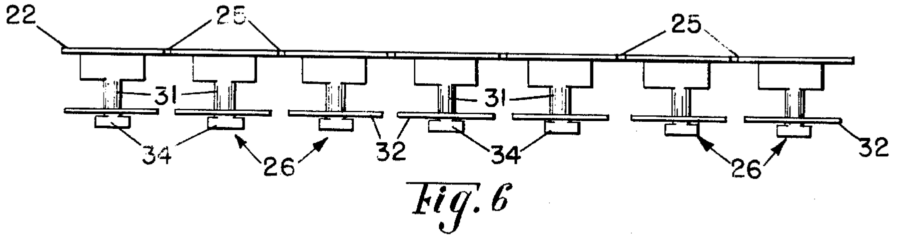
Figure 7:
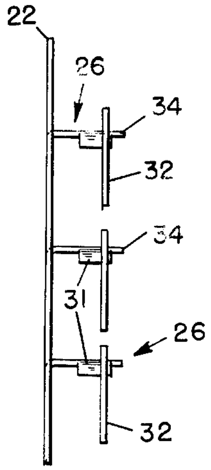
Figure 8:
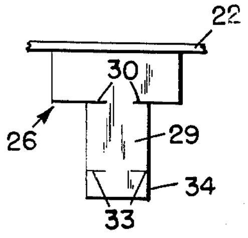
Figure 9:
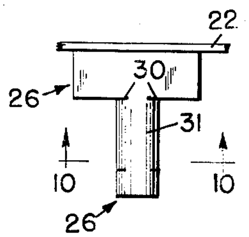
Figure 10:
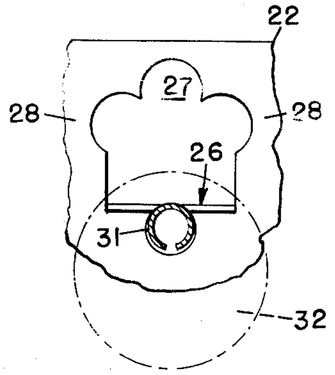
Figure 11:
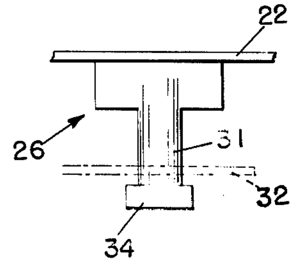
Figure 12:
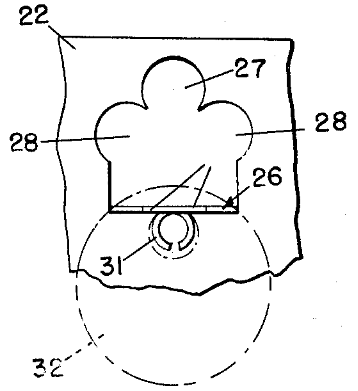
Figure 13:
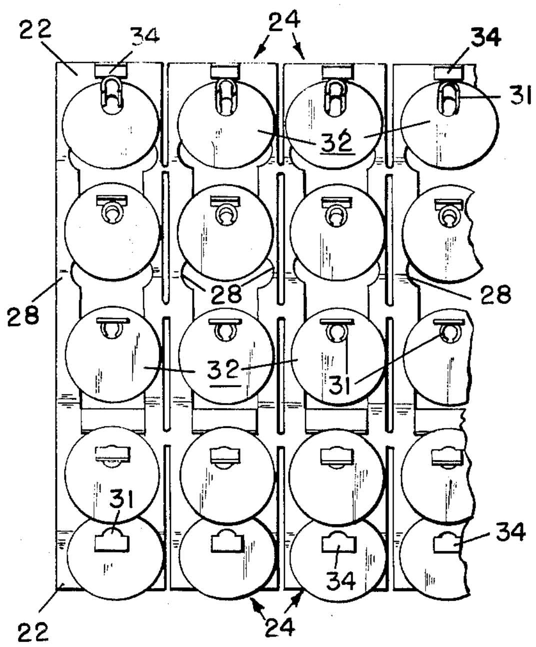
Figure 14:
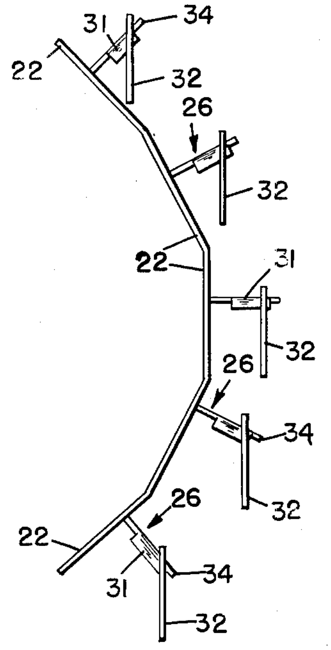
Figure 15:
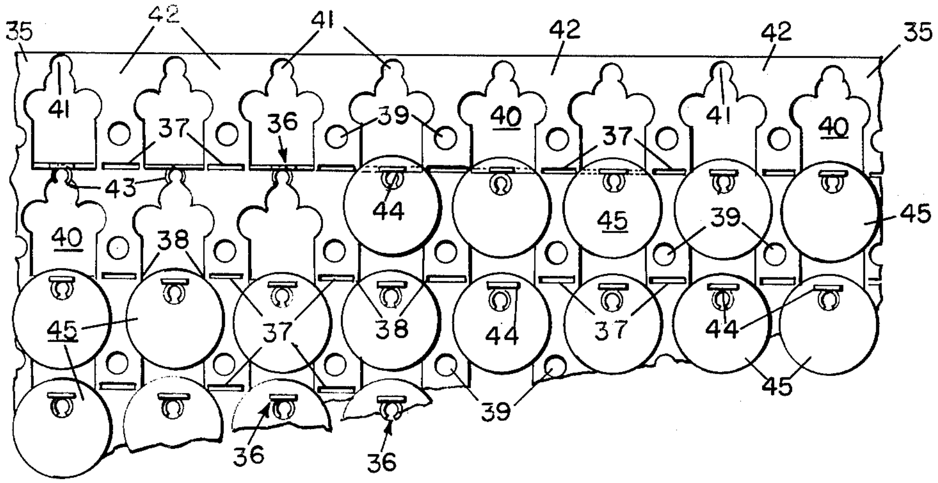
Figure 16:
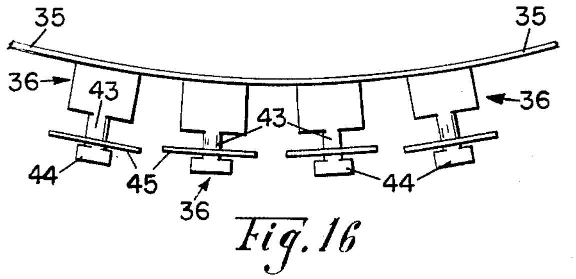
Figure 17:
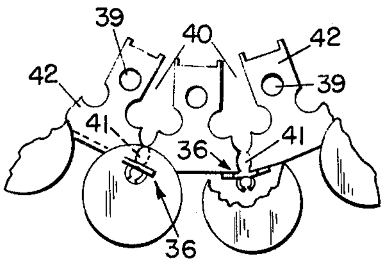
Figure 18:
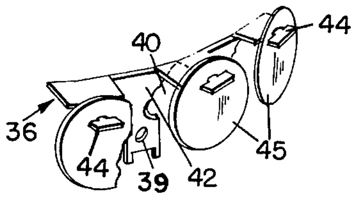

Other and further objects of the invention will become apparent from a reading of the following specification taken in conjunction with the drawings, in which:

FIGURE 1 is a front elevational view of a preferred embodiment of the invention, FIGURE 2 is a plan view of the disclosure of FIGURE 1, FIGURE 3 is an end elevational view of the showing of FIGURE 1, FIGURE 4 is an enlarged front elevational view of a single sequin portion of FIGURE 1, FIGURE 5 is a front elevational view of a modified form of the invention, FIGURE 6 is a plan view of the species of FIGURE 5, FIGURE 7 is an end elevational view of the showing of FIGURE 5, FIGURE 8 is an enlarged plan view of one of the tongues of FIGURE 6 prior to tubular bending of its post portion, FIGURE 9 is a plan view of the tongue of FIGURE 8 after being bent into tubular shape, FIGURE 10 is a front elevational view of the tongue of FIGURE 9 in section taken on line 10—10 of FIGURE 9, FIGURE 11 is a plan view of the disclosure of FIGURE 10 after sequin-retaining flattening of the tip thereof, FIGURE 12 is a front view of the disclosure of FIGURE 11, FIGURE 13 is a front elevational view of the sign structure of FIGURE 5 curved about a horizontal axis behind the structure, FIGURE 14 is an end elevational view of the disclosure of FIGURE 13, FIGURE 15 is a front elevational view of a further modification of the invention, FIGURE 16 is a plan view of the species of FIGURE 15 curved about a vertical axis, FIGURE 17 is a fragmentary elevational view of a row strip from the FIGURE 15 structure bent about a horizontal axis and with the base elements in a vertical plane, and FIGURE 18 is a fragmentary perspective view of a row strip bent about a vertical axis and with the tongues lying in a horizontal plane.

With reference now to FIGURES 1 through 4 of the drawings, the numeral 11 generally designates a unit comprising a sheet 12 of rolled aluminum alloy. The sheet 12 has been die cut to define horizontal rows 13 and vertical columns 14 of tongues 15 which are herein disclosed as being bent horizontally outwardly at right angles to the plane of the sheet 12 (FIG. 3).

Each tongue 15 has a head portion 16 which is roughly circular when flattened (FIGS. 3 and 4) but which is initially transversely arched to permit placement of a sequin 17 thereon for loose support thereof on the narrow neck portion 18 of the tongue 15. The base 19 of each tongue 15 is of generally triangular shape and extends fully to the plane of the sheet 12 so that the bases 19 do not rigidifyingly join each other edgewise (as in prior art devices of this type), thus desirably permitting flexing of the sheet 12 horizontally.

The base portions 19 of each row 13 of tongues 15 are interconnected by web portions 20 defined by the same die cuts that form the tongues of the next row below. The web portions 20 extend to the plane of said base portions so as not to rigidify the rows 13 against vertical bending when the rows are separated into single row strips by bending and breaking the sheet 12 along horizontal lines passing through the somewhat blunt apices 21 of the webs 20, where they have small area connections to the row below.

In the species of FIGURES 5 through 14, a base sheet 22 is divided by vertical rows of slits 23 into vertical column strips 24 interconnected laterally by small area webs 25, which can be easily broken by back-and-forth bending to provide vertical strips of one or more columns. The slits 23 and the small webs 25 also define flexible bend lines which facilitate bending the entire sheet 22 or parts thereof about a vertical axis.

Tongues 26 are die cut from the sheet 22 and are bent forwardly at right angles thereto as in the first-described species. The areas 27 of the strip 22 from which the tongues 26 are die cut have the cloverleaf shape shown in FIG. 5 to provide relatively narrow webs 28 intermediate successive tongues on the column strips 24 to increase the flexibility of the column strips (singly or conjointly) to facilitate their being bent about a horizontal axis or over vertically curved surface. Thus the base sheet 22 can be bent horizontally or vertically as desired. The lateral edges of the sheet 22 can be abutted to define a sequin covered vertical cylinder or post.

The tongues 26 desirably have initially a flat T-shaped configuration, as shown in FIG. 8. The stem 29 of the T is provided with pairs of slits 30 which permit bending of the stem 29 into a closed or nearly closed tubular post 31 (FIGS. 9 and 10) onto which sequins 32 are easily placed.

Each tongue stem 29 is also provided with a pair of inwardly directed slits 33 adjacent its tip to define a flattenable cross bar 34 thereon of a transverse dimension greater than the diameter of the mounting aperture in the sequin to retain the latter on the tubular post 31, as shown in FIGS. 5 6 and 12.

FIGURES 13 and 14 are, respectively, front and end elevational views showing the sheet 22 curved about a horizontal axis or over a vertically curved surface (not shown).

In the species of FIGURES 15 through 18, a base sheet 35 is die cut, as in the above described species, to define rows and columns of tongues 36. However, in this modification, the rows are separated by rows of slits 37 extending longitudinally of the sheet 35 to provide small are webs 38 between adjacent rows so that the rows can be easily separated into single or multiple row strips as desired. The webs 38 also define more flexible bend lines to facilitate bending of the sheet 35 about a horizontal axis (in the manner shown for the sheet 22 in FIG. 14). The sheet is also provided, in the areas between adjacent columns, with punched apertures to receive nails or screws for attaching the sheet 35 or strips thereof to a supporting surface.

The areas 40 from which the tongues 36 are die cut have upper medial extensions 41 reaching upwardly to the under surface of the tongues 36. The purpose of this refinement is to permit a single row of tongues to be bent into an arc (or circle) as shown in FIG. 17, the tongues being bendable about their longitudinal center lines with the connecting portions 42 of the sheet 35 lying in a vertical plane.

In FIGURE 18 a row of tongues 36 is disposed in a horizontal plane while its connecting portions 42 are curved about a vertical axis into an arc (or circle).

Post portions 43 and flattenable tip portions 44 of the tongue 35 are of the same general construction as parts 31 and 34 in the species of FIGS. 5 through 14, and sequins 45 are similar to those of the other modifications.

While several embodiments of the invention have been shown and described herein, it will be readily apparent to those skilled in the art that many minor modifications may be made without departing from the spirit of the invention or the scope of the appended claims.

What is claimed is:

1. A base for a mobile sequin sign, comprising: a sheet of bendable material having rows and columns of tongues cut therefrom defining rows and columns of openings, each of said tongues having a relatively wide base portion, a relatively narrow neck portion and a head portion, said neck portion having a rounded upper surface for low friction support of a sequin of said sign, said head portion being transversely curved so as to pass through an aperture in said sequin when being placed thereon, said head portion being flattenable to retain said sequin on said neck portion, the portions of said sheet between said opening defining web portions of small areas to facilitate curving said sheets by bending thereof along lines passing through aligned ones of said web portions and/or to facilitate flexing breaking of said sheet into strips of desired widths along said lines.

2. Structure according to claim 1, wherein said rounded upper surface has an upwardly convex arcuate extent of over 180°.

3. Structure according to claim 2, wherein said neck portion of said tongue is separated from said base and head portions thereof by at least one notch facilitating the tubular bending of said neck portion without tearing of said sheet.

References Cited by the Examiner

UNITED STATES PATENTS

| | | | |
|---|---|---|---|
| Re. 24,368 | 10/57 | Touche | 40—138 |
| 2,843,288 | 7/58 | Buecker et al. | 211—10 |

CLAUDE A. LE ROY, *Primary Examiner.*